US009467426B2

(12) United States Patent
Kim et al.

(10) Patent No.: US 9,467,426 B2
(45) Date of Patent: *Oct. 11, 2016

(54) SECURE MOBILE APP CONNECTION BUS

(71) Applicant: MOBILE IRON, INC., Mountain View, CA (US)

(72) Inventors: Mansu Kim, Cupertino, CA (US); Joshua Sirota, Los Altos, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,311

(22) Filed: Apr. 17, 2015

(65) Prior Publication Data

US 2015/0319143 A1 Nov. 5, 2015

Related U.S. Application Data

(63) Continuation of application No. 14/137,745, filed on Dec. 20, 2013, now Pat. No. 9,059,974.

(60) Provisional application No. 61/745,052, filed on Dec. 21, 2012.

(51) Int. Cl.
*H04L 29/06* (2006.01)
*H04W 12/04* (2009.01)
(Continued)

(52) U.S. Cl.
CPC .............. *H04L 63/0428* (2013.01); *G06F 9/54* (2013.01); *G06F 21/6281* (2013.01); *H04L 9/08* (2013.01); *H04W 12/04* (2013.01)

(58) Field of Classification Search
CPC ........ H04L 63/0428; H04L 9/08; G06F 9/54
USPC ......................................................... 380/282
See application file for complete search history.

(56) References Cited

U.S. PATENT DOCUMENTS

2004/0228492 A1* 11/2004 Park ...................... H04L 9/0825
380/277
2008/0046983 A1* 2/2008 Lester ...................... G06F 21/31
726/5

(Continued)

FOREIGN PATENT DOCUMENTS

FR EP 1858193 * 5/2006

OTHER PUBLICATIONS

Mohamed, "Android vs. iOS Security: A Comparitive Study", IEEE, 2015, p. 725-730.*

(Continued)

*Primary Examiner* — Morshed Mehedi
*Assistant Examiner* — Gregory Lane
(74) *Attorney, Agent, or Firm* — Van Pelt, Yi & James LLP

(57) ABSTRACT

A secure mobile application connection bus is disclosed. First encryption information and an identifier associated with a data storage location on a mobile device are provided from a first application to a second application. Second encryption information associated with the second mobile application is retrieved from the data storage location. The second mobile application is configured to provide data to the data storage location. Data is transferred securely between the first mobile application and the second mobile application via the data storage location.

20 Claims, 7 Drawing Sheets

(51) Int. Cl.
*H04L 9/08* (2006.01)
*G06F 9/54* (2006.01)
*G06F 21/62* (2013.01)

(56) References Cited

U.S. PATENT DOCUMENTS

| | | | | |
|---|---|---|---|---|
| 2008/0134347 | A1* | 6/2008 | Goyal | G06F 21/6209 726/29 |
| 2009/0100264 | A1 | 4/2009 | Futa et al. | |
| 2010/0306076 | A1* | 12/2010 | Taveau | G06Q 20/02 705/26.8 |
| 2011/0154015 | A1* | 6/2011 | Rahman | G06F 21/6209 713/150 |
| 2011/0213980 | A1* | 9/2011 | Surace | G06F 21/34 713/171 |
| 2011/0246374 | A1* | 10/2011 | Franz | G06Q 20/085 705/77 |
| 2012/0066767 | A1* | 3/2012 | Vimpari | H04L 9/0866 726/26 |
| 2012/0302212 | A1* | 11/2012 | Ross | H04W 12/06 455/411 |
| 2013/0091543 | A1* | 4/2013 | Wade | G06F 21/54 726/1 |
| 2013/0145455 | A1* | 6/2013 | Vijayshankar | G06F 21/70 726/16 |
| 2013/0198510 | A1* | 8/2013 | Rahman | H04L 9/321 713/155 |
| 2014/0068273 | A1 | 3/2014 | Sobel et al. | |
| 2014/0068593 | A1 | 3/2014 | Mcerlane et al. | |

OTHER PUBLICATIONS

Mithilesh Kumar, Sharing data among iOS applications using UIPasteboard, Mar. 21, 2012, http://kmithi.blogspot.com/2012/03/sharing-data-among-ios-applications.html.

U.S. Appl. No. 14/137,845, Secure Mobile APP Connection Bus, Application Filed Dec. 20, 2013.

U.S. Appl. No. 14/195,727, Secure APP-to-APP Communication, Application Filed Mar. 3, 2014.

* cited by examiner

SECURE MOBILE APP CONNECTION BUS

CROSS REFERENCE TO OTHER APPLICATIONS

This application is a continuation of co-pending U.S. patent application Ser. No. 14/137,745, entitled SECURE MOBILE APP CONNECTION BUS filed Dec. 20, 2013 which is incorporated herein by reference for all purposes, which claims priority to U.S. Provisional Application No. 61/745,052, entitled SECURE MOBILE APP CONNECTION BUS filed Dec. 21, 2012 which is incorporated herein by reference for all purposes.

BACKGROUND OF THE INVENTION

Mobile devices, such as smartphones and tablets, may include multiple applications from a variety of sources including a trusted app store, a third-party app store, an enterprise in-house developer, and/or other sources. And, each application may have a unique approach to managing its configuration, policies, data, and/or other attributes. In certain cases, one or more applications may be managed within a mobile device management (MDM) framework including, for example, a management agent on the mobile device and/or management server. Secure communication between different types of applications is helpful to the proper functioning of a mobile device.

BRIEF DESCRIPTION OF THE DRAWINGS

Various embodiments of the invention are disclosed in the following detailed description and the accompanying drawings.

DETAILED DESCRIPTION

Figure 1:
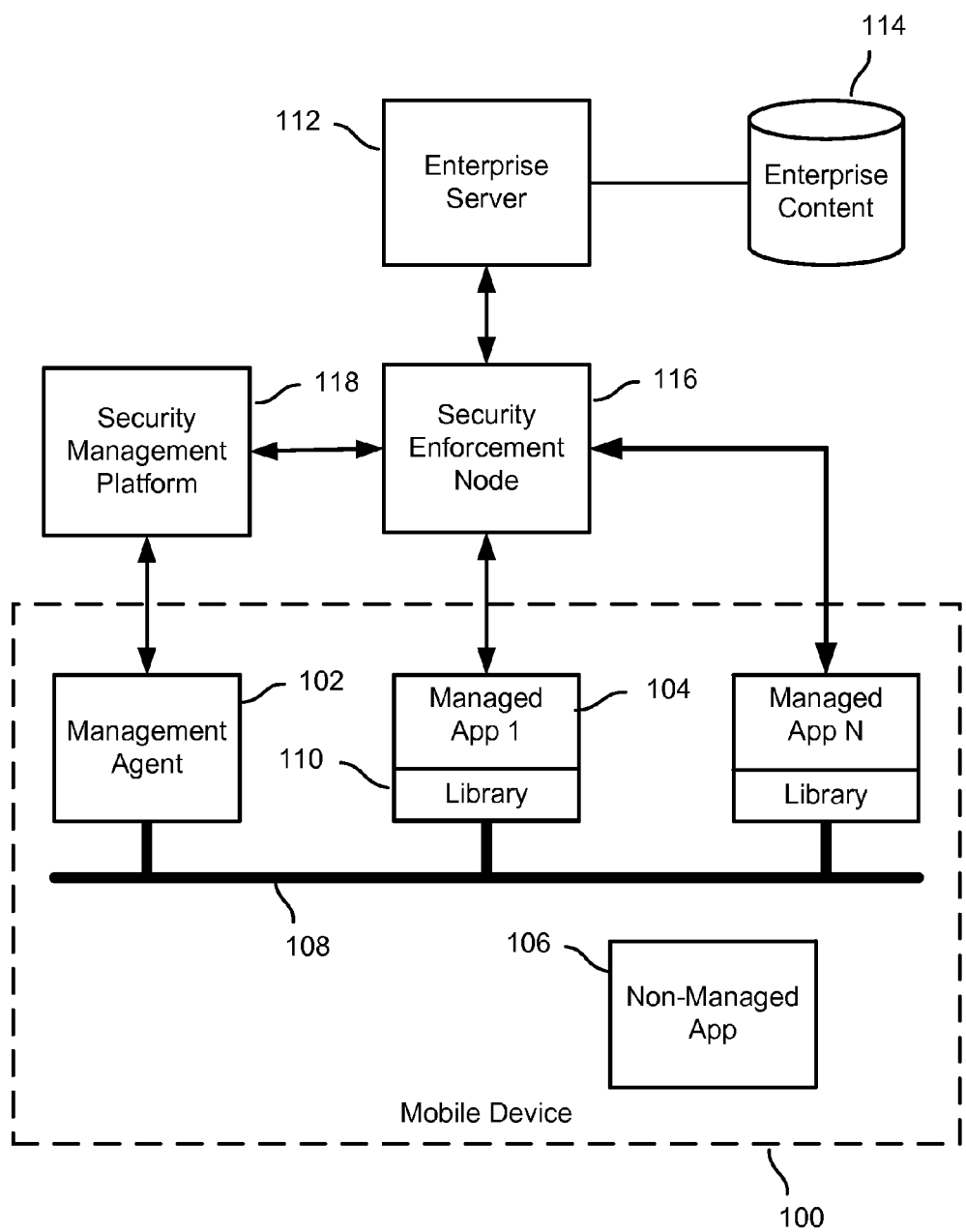
FIG. 1 is a block diagram illustrating an embodiment of a system including a secure mobile application connection bus.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A secure mobile application connection bus is disclosed. In various embodiments, a secure mobile application connection bus (e.g., secure inter-application connection bus, secure mobile application communication bus, secure mobile application command bus) may be used to securely transfer information (e.g., commands, configuration information, policies) between applications. In some embodiments, the techniques disclosed herein allow a management server and a trusted management agent installed on the device (e.g., a management app) to have a two-way secure application connection bus to manage applications (e.g., application configurations, policies, etc.) on a mobile device while maintaining a seamless user experience. For example, the secure connection bus may be used to transfer commands/information securely between managed application(s) and a trusted management agent running on the mobile device.

According to various embodiments, a secure application connection bus is established by exchanging information needed to transfer data in encrypted form by storing the encrypted data in a storage location accessible to the sending and receiving app(s). In some embodiments, first encryption information and an identifier associated with a data storage location on a mobile device are provided from a first application to a second application. Second encryption information associated with the second mobile application is retrieved from the data storage location. The second mobile application is configured to provide data to the data storage location. Data is transferred securely between the first mobile application and the second mobile application via the data storage location. In various embodiments, the path (e.g., tunnel), technique, and/or process of secure transfer between the first mobile application, data storage location, and second application may be a secure application connection bus.

FIG. 1 is a block diagram illustrating an embodiment of a system including a secure mobile application connection bus. In the example shown, a mobile device 100 (e.g., smartphone, tablet, etc.) includes a management agent 102 (e.g., a mobile device management (MDM) agent, a trusted management agent, trust client app), managed application(s) 104 (e.g., managed client application(s)), non-managed application(s) 106 (e.g., non-authorized application(s), untrusted application(s)), and/or other applications. The management agent 102, managed applications 104, and/or other components may be components of a MDM system. The management agent 102, managed applications 104, and/or other components are configured to share information/data in a trusted manner via a secure mobile application connection bus 108 (e.g., secure inter-application connection bus, secure application command bus, secure application communication bus, etc.). For example, information may be shared in a trusted manner among applications authorized to access the secure connection bus 108.

In some embodiments, a library 110 (e.g., a library compiled into the application, wrapped into the application) may be associated with a managed application 104. The library 110 may modify an application's code to behave differently than the corresponding unmodified version of the application behaves. For example, the library 110 may reconfigure a managed application 104 to allow the management agent 102 to perform actions on behalf of the managed application including invoking mobile operating system components, using mobile device resources, and accessing/storing application data. The library 110 may mediate communication between a managed application 104 and the management agent 102 and/or other managed application(s) 104. The library 110 may, in some embodiments, apply configuration changes, enforce policies, execute actions, and/or perform other operations within the managed application 104.

According to various embodiments, the management agent 102, managed applications 104, and/or other elements are configured to transfer data in a trusted manner (e.g., securely) via the secure mobile application connection bus 108. In some embodiments, data may be transferred in a trusted manner among applications authorized to have access to the secure mobile application connection bus 108 by storing the data in an encrypted form in a data storage location (e.g., a paste board, shared keychain location, and/or other storage), which is accessible to the entities authorized to communicate via the bus 108. In various embodiments, data may be transferred in a trusted manner from a first application (e.g., the management agent 102) to a second application (e.g., a managed application 104) authorized to have access to the secure mobile application connection bus 108 by calling a uniform resource locator (URL) scheme associated with the second application including the encrypted data. Techniques for securely transferring data between applications using a secure mobile connection bus 108 are discussed in detail below.

According to various embodiments, communications between the mobile device 100 and enterprise backend server(s) 112 (e.g., enterprise servers, file server, email server, application servers, etc.), enterprise content 114 (e.g., files, enterprise data), network resources, and/or other components may pass through a security enforcement node 116 (e.g., a reverse proxy server, sentry). In various embodiments, the security enforcement node 116 is a reverse proxy for synchronization, data transfer, and/or other traffic between managed applications 104 and enterprise servers such as the backend server 112. While processing (e.g., managing) the traffic (e.g., securely transferred data), the security enforcement node 116 may optimize traffic (e.g. compress) and/or add, modify, and/or remove content based on one or more policies from security management platform 112 (e.g., add emergency alert to web request). In the case of email, in various embodiments security enforcement node 116 relays traffic between mobile devices, such as mobile device 100, and a backend email server (e.g., Microsoft Exchange® server) or proxy for other email traffic (e.g., IMAP, MAPI, and SMTP). In the case of content management and/or file or other content sharing services, such as SharePoint®, WebDAV, and file servers, the security enforcement node 116 in various embodiments servers as a proxy (e.g. reverse proxy) for the applicable protocol (e.g., Microsoft SharePoint®, WebDAV, or file server protocols). In various embodiments, the library 110 may provide a secure tunneling upper level protocol to the security enforcement node 116 (e.g., secure sockets layer/transport layer security (SSL/TLS) tunnel). With secure tunneling, any managed apps 104 may connect to the enterprise server 112 using the security enforcement node 116. In various embodiments, security enforcement node 116 may archive unencrypted traffic to, for example, one or more archiving servers.

In various embodiments, a security management platform 118 (e.g., a virtual smartphone platform, security management server, etc.) manages configuration(s), polic(ies), and/or settings associated with the mobile device 100. The security management platform 118 may manage (e.g., control, dictate, determine) the configurations, policies, settings, and/or other functional aspects of one or more of the managed applications 104 on the mobile device 100. For example, the security management platform 118 may communicate with managed applications 104 using the management agent 102 as intermediary. Configuration changes, policy updates, setting changes, and/or commands for the managed applications 104 may be pushed to the management agent 102 for secure distribution to the applications 104. In some embodiments, the management agent 102 may, for example, connect to the security management platform 118 (e.g., on a periodic basis) to update the device 100 status, retrieve policy information, retrieve configuration information, and/or perform other operations. The management agent 102 may securely transfer information between the security management platform 118 and the managed applications 104 via the secure mobile application connection bus 108.

In various embodiments, the library 110 may use a security token (e.g., certificate(s), application identification, authentication state, etc.) received from (e.g., pushed from) the security management platform 118. The security enforcement node 116 may analyze (e.g., evaluate) a security token with (e.g., against) the policy on security management platform 118 to determine whether to allow, restrict (e.g., partially allow), and/or deny access to an enterprise server 112. In various embodiments, the library 110 can provide a security token to a $3^{rd}$ party server to use in authentication operations. The $3^{rd}$ party server(s) can, for example, validate the security token to the security management platform 118.

Figure 2:
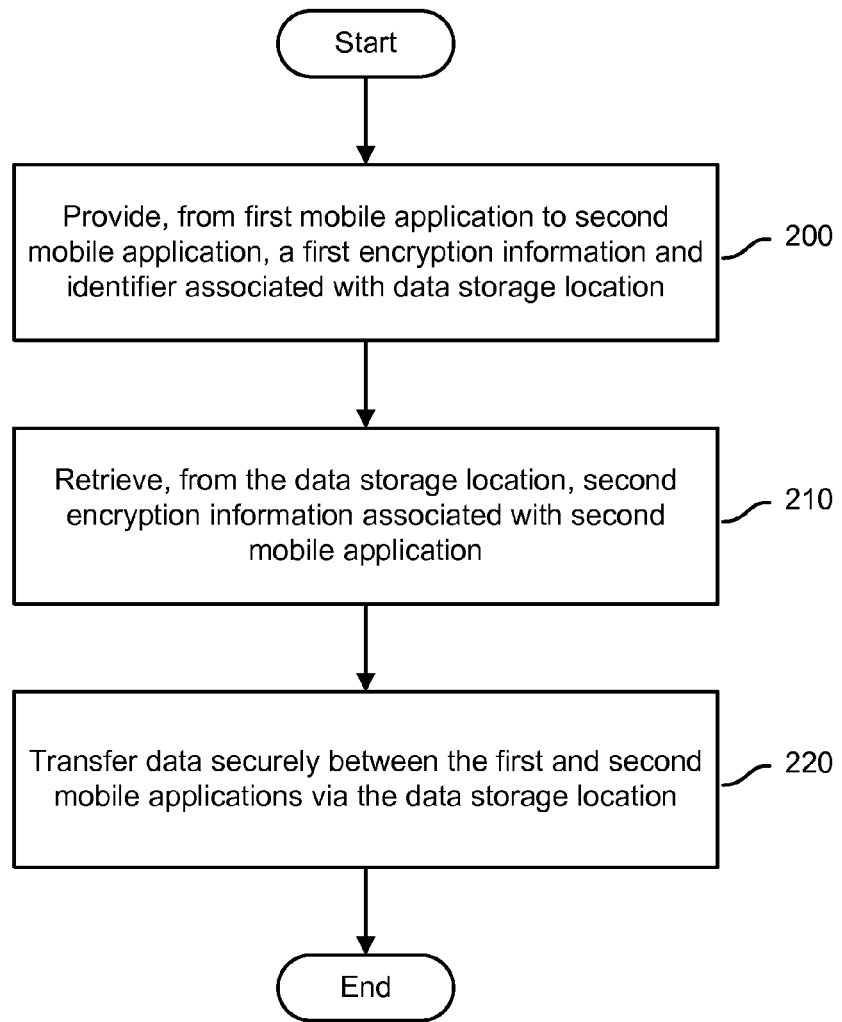
FIG. 2 is a flowchart illustrating embodiments of a process of secure communication between mobile applications.

FIG. 2 is a flowchart illustrating embodiments of a process of secure communication between mobile applications. In various embodiments, the process is performed by the system 100 of FIG. 1. At 200, first encryption information and an identifier associated with a data storage location on a mobile device are provided from a first mobile application to a second mobile application. In some embodiments, a first encryption information may include encryption-handshake information (e.g., a public key associated with private-public key pair) generated by the first application.

In various embodiments, the data storage location may include a paste board, shared keychain, a data storage location associated in a native MDM framework, and/or any other storage location (e.g., memory) on the mobile device. In one example embodiment, the data storage location may include a pasteboard on the device. The pasteboard may include a named region of memory on the mobile device where information may be shared between applications, objects in applications, and/or other elements. By way of example, a mobile device (e.g., native operating system) may include one or more pasteboards including, for example, system-wide pasteboards (e.g., a general pasteboard (e.g., a pasteboard for copy-paste operations involving any type of data), a find pasteboard (e.g., a pasteboard used in search operations)), application-specific pasteboards (e.g., a pasteboard generated by application(s)), and/or other types of pasteboards. For example, one application may provide information to a pasteboard for retrieval by another application.

According to some embodiments, first encryption information, identifier(s) associated with a data storage location, and/or other information may be provided from the first application to the second application via a data storage location accessible by the second application, via a uniform resource locator (URL) scheme (e.g., as discussed in detail below), and/or using other techniques.

At 210, second encryption information associated with the second application may be retrieved (e.g., by the first mobile application) from the data storage location. In some embodiments, the second encryption information may include encryption information associated with the second mobile application. The second encryption information may include encryption handshake information generated by the second mobile application (e.g., a managed application on the mobile device). In various embodiments, the second encryption information may include one or more credentials associated with the second mobile application. Credentials associated with the second mobile application may include an application identifier, bundle identifier (e.g., bundle ID), and/or other credential information. In some embodiments, the second mobile application may be configured to receive data from and provide data to the data storage location. For example, a library and/or software development kit (SDK) associated with the second mobile application may orchestrate transfer of data to the data storage location. In various embodiments, the second encryption information may be retrieved from the data storage location by the first mobile application.

At 220, data is transferred securely between the first application and the second mobile application via the data storage location. In some embodiments, data (e.g., payload(s), application configuration information, policies, settings, files, commands, and/or any type of data) may be encrypted using one or more of the first encryption information and the second encryption information. For example, a first mobile application may encrypt data using a key (e.g., a private key associated with the private-public key pair generated by the first mobile application), and the encrypted data may be provided to the data storage location (e.g., pasteboard, secure keychain storage location, a storage location associated with an MDM framework native to the device) for retrieval by the second application. The second application may retrieve the encrypted data from the data storage location and decrypt the data using one or more of the first encryption information and/or the second encryption information. The second application may use a similar to process to encrypt data and provide the encrypted data to the data storage location for retrieval by the first application. Using these techniques (e.g., a secure application connection bus), data is securely transferred between the first mobile application and second mobile application.

Figure 3:
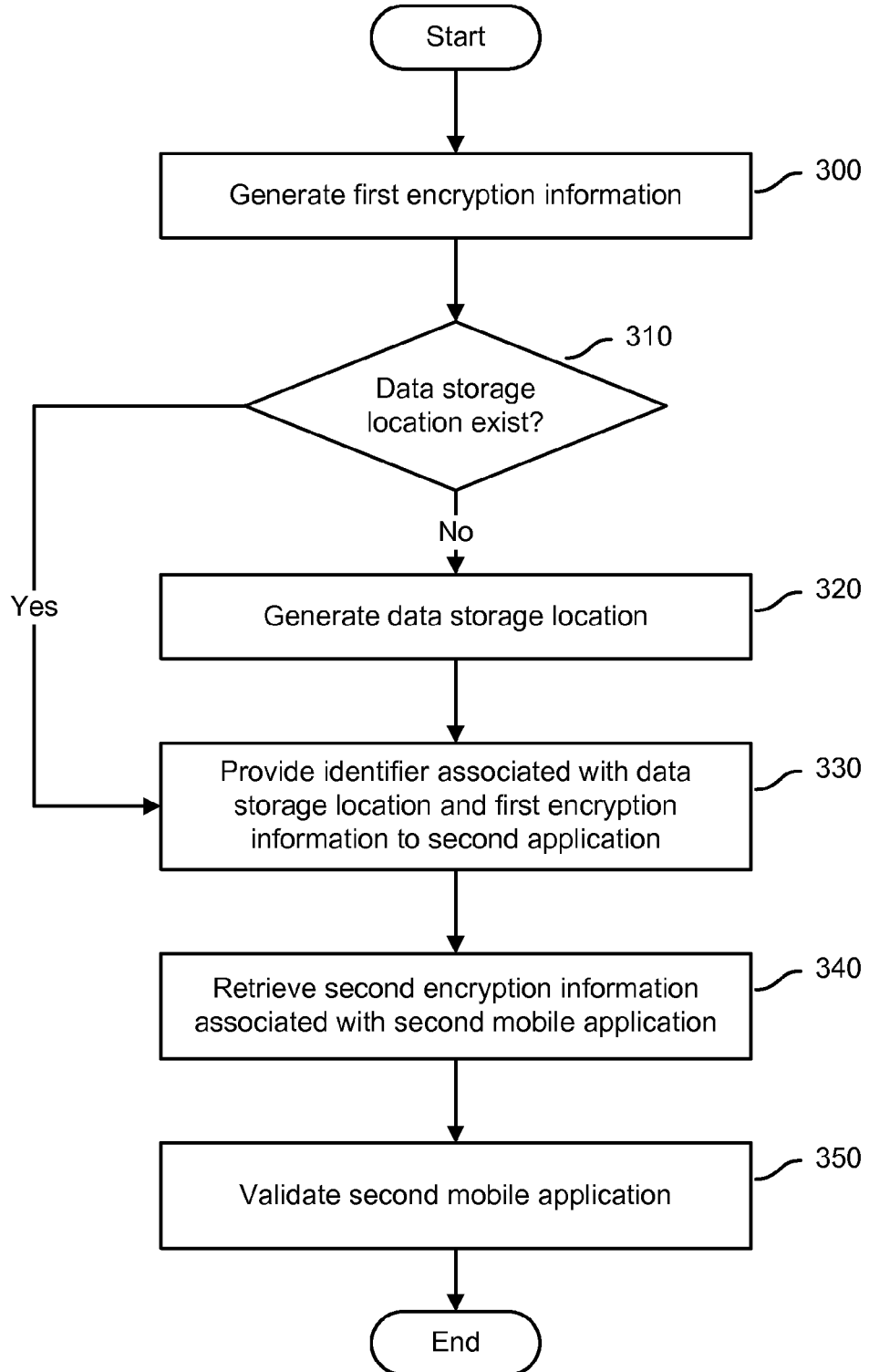
FIG. 3 is a flowchart illustrating embodiments of a process of secure communication between mobile applications.

FIG. 3 is a flowchart illustrating embodiments of a process of secure communication between mobile applications. In various embodiments, the process is performed by the system 100 of FIG. 1. The process of FIG. 3 illustrates embodiments of a process for generating a secure application connection bus from the perspective a first mobile application (e.g., a management agent on a mobile device). At 300, first encryption information may be generated (e.g., by the first application, a security management server). In various embodiments, the first encryption information is encryption handshake information generated by the first application (e.g., mobile agent), a security management platform, and/or other component. The first encryption information may be generated to establish a mechanism for secure connection between the first mobile application and second mobile application.

In some embodiments, communications between the first and second application applications may be protected using Diffie-Hellman asymmetric encryption, public-key cryptography, asymmetric cryptography, RSA encryption, and/or other approaches. These are of course some example approaches for securing data passed between applications; however, any suitable encryption (e.g., cryptographic) approach may be used to encrypt/secure information (e.g., payloads) discussed herein. In some embodiments, a mobile application, the mobile device operating system, a security management platform, and/or other components may be configured to encrypt data using any of the encryption techniques.

In some embodiments, the first encryption information may include encryption handshake-associated information generated by the first mobile application (e.g., a management agent on the mobile device). For example, the first encryption information may include a public key associated with private-public key pair (e.g., encryption key pair) generated at the first application (e.g., a management agent on the mobile device). The private-public key pair may be used to encrypt information such that only the first mobile application and second mobile application may access (e.g., decrypt) the encrypted information.

In various embodiments, the first encryption information may include encryption handshake-associated information generated by a security management platform (e.g., MDM server) that manages one or more applications on the mobile device (e.g., via a management agent on the device). For example, the first encryption information may include a public key associated with private-public key pair generated at the security management platform. In this example, the first application (e.g., management application) may act as an intermediary to deploy the first encryption information to a second mobile application (e.g., a destination managed application). In this case, information transferred from the security management platform to the second mobile application (e.g., managed application) via the first mobile application (e.g., management agent) may not be decrypted by the first mobile application (e.g., management agent).

At 310, it may be determined (e.g., by the first mobile application) whether a suitable data storage location exists on the device for transfer of data between the first mobile application and a second mobile application. As discussed above, example data storage locations suitable for secure transfer of information between applications include a pasteboard (e.g., an application-specific pasteboard), shared keychain, data storage location associated with a native MDM framework (e.g., the iOS MDM framework), and/or other data storage locations. In some embodiments, a system pasteboard (e.g., general pasteboard) associated with the mobile device (e.g., native to the mobile device) may be used. A system pasteboard may, however, be less secure than an application-specific pasteboard, and it may be determined that an application-specific pasteboard should be generated.

In various embodiments, a shared keychain (e.g., certificate) storage location may be identified (e.g., by the first mobile application). An operating system associated with a device may, for example, provide a certificate storage location for one or more applications. In some embodiments, the certificate storage location may be used to transfer data between applications (e.g., may be used as a data storage location).

In the event a data storage location exists on the device (e.g., was previously generated), the process may proceed to step 330. In the event a data storage location does not exist on the device, the process may proceed to step 320.

At 320, a data storage location may be generated. In various embodiments, the first mobile application (e.g., a management agent) may generate a data storage location on the device. As discussed above, the data storage location may include a pasteboard, shared keychain, a data storage location associated with a native MDM framework, and/or any other storage location (e.g., memory) on the mobile device.

In some embodiments, the first mobile application (e.g., a management agent) may generate a pasteboard (e.g., an application-specific pasteboard) to share information with the second mobile application. In various embodiments, an object associated with the first application may generate an application-specific pasteboard by invoking/calling a pasteboard generation class method associated with the operating system of a mobile device. The application-specific pasteboard may be generated and a pasteboard identifier (e.g., a pasteboard object, a unique identifier) may be returned to the first mobile application. In some embodiments, it may be specified (e.g., by the first mobile application) whether the pasteboard is persistent (e.g., remains in existence after the application is closed/quits). The pasteboard may be used to transfer data within the first mobile application and/or from the first mobile application to the second mobile application. The pasteboard example discussed above is of course one example data storage location, and other types of data storage locations may be generated.

At 330, first encryption information and an identifier associated with the data storage location may be provided to the second application. In some embodiments, the first encryption information, identifier associated with a data storage location, and/or other information may be provided to the second mobile application using a variety of approaches. In various embodiments, an approach for providing information from the first application (e.g., a management agent) to a second application (e.g., a managed application) may be governed by a security management platform (e.g., a security management server) external to the mobile device. In that case, the determined information transfer approach may be pushed from the security management platform to the management agent for implementation on the mobile device.

In various embodiments, the first encryption information, identifier associated with a data storage location, and/or other information may be provided from the first application to the second application using a URL scheme associated with the second mobile application. For example, one or more mobile applications on a device may each be associated with an application-specific URL scheme (e.g., application "ABC" may be associated with the URL scheme "abc://"). An application may, for example, register a URL scheme with the mobile device operating system, and once registered other applications, the operating system, and/or other components may reference, invoke, and/or otherwise interact with the application using the URL scheme. URL schemes associated with an application may, for example, be stored in a URL scheme repository.

In some embodiments, a first application may query the operating system associated with the mobile device to determine/identify/retrieve a URL scheme associated with the second mobile application. By way of example, the OS may look up the URL scheme in a repository/database and provide the URL scheme information to the first mobile application.

According to some embodiments, the URL scheme may be used to transfer data from the first application to the second application. For example, the first mobile application (e.g., management agent) may pass data (e.g., the data string "12345") to the second mobile application (e.g., a managed application "ABC") by calling the URL scheme associated with the managed application including the data string (e.g., the management application may call "abc://12345"). When that managed application (e.g., the ABC application) receives the URL it may process (e.g., parse) the URL and take the content (e.g., "12345") for its use. Using these techniques, the first encryption information, identifier associated with a data storage location, and/or other information may be provided from the first application to the second application.

In some embodiments, the first encryption information, identifier associated with a data storage location, and/or other information may be provided to a general pasteboard (e.g., a data storage location) associated with the mobile device. And, the second application may be configured to retrieve the information from the general pasteboard.

At 340, second encryption information associated with the second mobile application may be retrieved from the data storage location. In various embodiments, the second encryption information may include encryption handshake-associated information generated by the second mobile application (e.g., a managed application on the mobile device), credentials associated with the second mobile application, and/or other information. In some embodiments, the encryption handshake information may include a public key (e.g., a second application public key) associated with a private-public key pair (e.g., encryption key pair) generated by the second application (e.g., a management agent on the mobile device). In various embodiments, the second encryption information may include an encrypted payload including an encrypted version of the first application public key, as discussed below.

According to some embodiments, the second encryption information may include one or more credentials associated with the second mobile application. Credentials associated with the second mobile application may include, for example, an application identifier, bundle identifier (e.g., bundle ID), and/or other credential information. Credentials associated with a second mobile application may identify the mobile application to the operating system, other applications, and/or other components.

At 350, the second mobile application may be validated. In some embodiments, the first mobile application (e.g., a management agent) may validate the identity (e.g., credentials) of the second mobile application (e.g., a managed application) with a security management server (e.g., security management platform). For example, the first mobile application may retrieve from the data storage location credential information associated with the second mobile application. The credential information may be passed from the first mobile application to the security management platform. The security management platform may validate the identity of the second mobile application by comparing the credentials associated with second application to one or more stored sets of credentials for the mobile device (e.g., applications on the mobile device).

In some embodiments, the credentials of the second mobile device may be validated by the first mobile application (e.g., a management agent). For example, the first mobile application may compare the second mobile application credentials (e.g., retrieved from a data storage location) to a list of managed applications accessible to the management agent.

Figure 4:
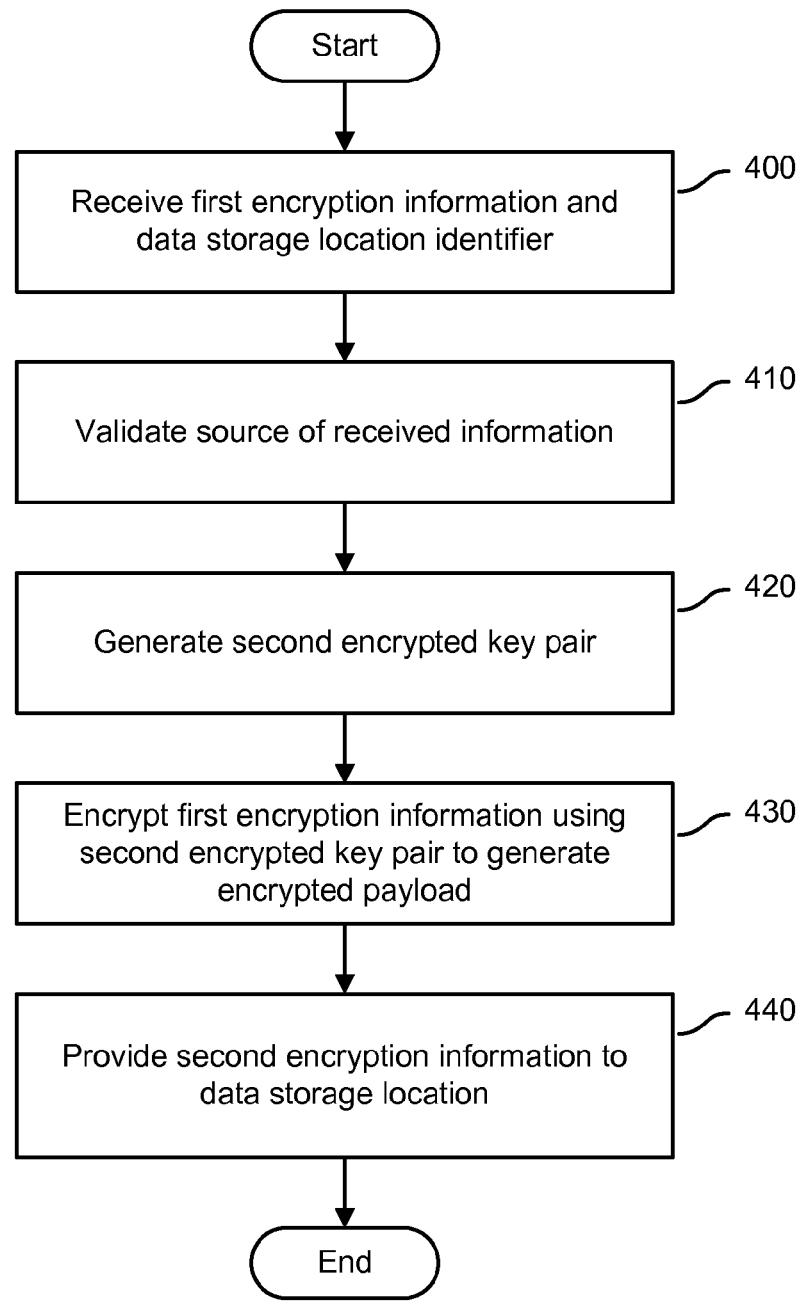
FIG. 4 is a flowchart illustrating embodiments of a process of secure communication between mobile applications.

FIG. 4 is a flowchart illustrating embodiments of a process of secure communication between mobile applications. In various embodiments, the process is performed by the system 100 of FIG. 1. The process of FIG. 4 describes embodiments of a process for generating a secure application connection bus from the perspective of a second mobile application (e.g., a managed application on a mobile device). At 400, first encryption information and an identifier associated with a data storage location may be received. In some embodiments, a second application (e.g., managed application) may receive first encryption information associated with a first application (e.g., a management agent). The first encryption information may include, for example, a public key associated with the first mobile application (e.g., a first public key).

In various embodiments, the first encryption information, identifier associated with a data storage location, and/or other information may be provided to the second application (e.g., from the first application) using a URL scheme associated with the second mobile application, via a pasteboard, and/or using other techniques, as discussed in detail above.

At 410, a source of the received information (e.g., the first encryption information, identifier associated with the data storage location, etc.) may be validated. In some embodiments, a library (e.g., a library compiled into the application, wrapped into the application, an SDK) may be associated with the second application (e.g., a managed application). The library may be associated with an MDM framework (e.g., managed application architecture) of which the second application is a member. In some embodiments, the library may include a list of trusted applications. And, an identifier associated with the first mobile application from which the information was received may be compared to the list for validation. In the event an identifier associated with the first mobile application (e.g., the management agent) is validated by the library, the secure connection bus generation process will proceed. In the event the identifier associated with the first mobile application is not validated (e.g., by the library), the process may be terminated.

According to some embodiments, the first encryption information, identifier associated with a data storage location, and/or other information may be provided to the second application (e.g., from the first application) using a URL call associated with the second mobile application. For example, the first application public key and data storage location identifier may be included a URL call (e.g., "secondapp://first_application_publickey+data_storage_location"), and the second application (e.g., managed application) may receive the URL call and process (e.g., parse) the information included in the call. The URL may be processed (e.g., parsed) to extract the first encryption information (e.g., first application public key), data storage location identifier, and/or other information. In various embodiments, the URL call may include information identifying the source of the URL call (e.g., the first mobile application). The source identifying information may be extracted and used to validate the first mobile application (e.g., by the library) using the techniques discussed above.

At 420, a second encrypted key pair may be generated. In some embodiments, the second mobile application (e.g., a managed application) may generate a private-public key pair (e.g., a second key pair). The private-public key pair (e.g., a second key pair) may be generated using any suitable encryption approach (e.g., the approaches discussed herein and/or those known in the art). The second encryption information may include, for example, a second application public key associated with the second mobile application private-public key pair.

At 430, the first encryption information (e.g., received from the first mobile application) may be encrypted using at least a portion of the second encryption information to generate an encrypted payload. For example, the second application (e.g., a managed application) may encrypt the first application public key using a private key (e.g., a second application private key) associated with a private-public key pair generated by the second application.

At 440, the second encryption information may be provided to the data storage location. In some embodiments, the second encryption information may include the second application public key (e.g., generated in step 420), an encrypted payload including a second mobile application encrypted version of the first public key (e.g., generated in step 430), at least one credential associated with the second application, and/or other information. For example, the at least one credential associated with the second application may include an application identifier (e.g., bundle ID associated with the iOS application) and/or other information associated with the second application.

In some embodiments, the second encryption information may be provided to the data storage location (e.g., pasteboard, shared keychain, and/or other data storage location), and the first mobile application may retrieve the second encryption information. The first mobile application may, for example, use the second encrypted information to decrypt any payloads subsequently received from the second mobile application.

Figure 5:
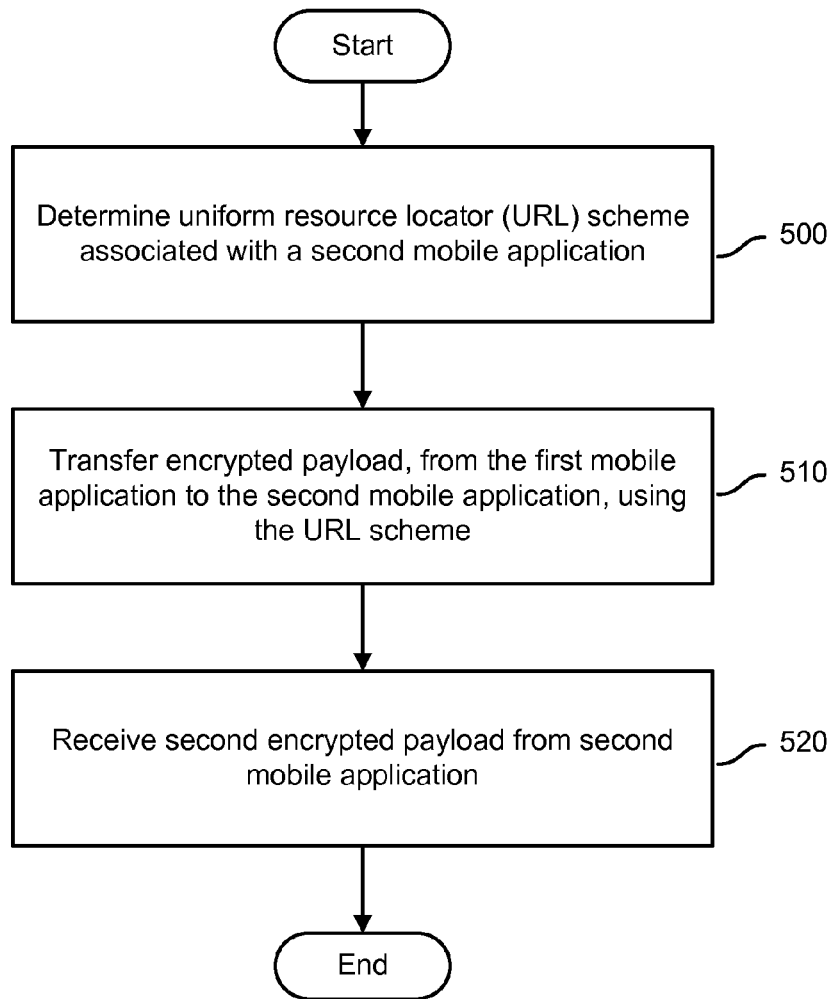
FIG. 5 is a flowchart illustrating embodiments of a process of secure communication between mobile applications.

FIG. 5 is a flowchart illustrating embodiments of a process of secure communication between mobile applications. In various embodiments, the process is performed by the system 100 of FIG. 1. At 500, a URL scheme associated with a second mobile application may be determined by a first mobile application. In some embodiments, the URL scheme associated with the second mobile application may be determined by querying an operating system (e.g., iOS, Android, etc.) associated with the mobile device. An operating system associated with the mobile device may include a registry of URL schemes and associated applications. In this example, the second mobile application on a device may, for example, register a URL scheme (e.g., secondapp://) with the operating system. The first mobile application may also be associated with a URL scheme (e.g., firstapp://, MDMagent://, etc.). The URL schemes and association of the URL schemes with the mobile applications may be stored in the operating system URL registry. In some embodiments, the first mobile application may retrieve the URL scheme associated with the second mobile application from the operating system (e.g., URL scheme registry/database).

At 510, encrypted payloads may be transferred from the first mobile application to the second mobile application using the URL scheme. In various embodiments, a URL call may be executed based at least in part on the URL scheme associated with the second mobile application. In some embodiments, an encrypted payload may be included in a URL call generated and/or executed by the first mobile application. For example, the encrypted payload (e.g., "12345") may be included in the URL call (e.g., secondapp://12345). The second application may receive the URL call and parse the URL to extract the encrypted payload (e.g., "12345"). The encrypted payload may be decrypted using a previously-shared key (e.g., a first application public key, a security management platform public key). In some embodiments, the second mobile application may have received the previously-shared key via a data storage location (e.g., a pasteboard, shared keychain storage location, and/or other data storage location), a previous URL call, and/or other mechanism (e.g., different than those described herein).

In some embodiments, the second mobile application is configured to validate at least one credential associated with the first application based at least in part on the URL scheme. For example, the URL call may include information identifying the source of the URL call (e.g., the first mobile application). The source identifying information may be extracted and used to validate the first mobile application. In some embodiments, a library associated with the second application may include a list, database, and/or other data structure including trusted sources (e.g., mobile applications). Credentials associated with the first mobile application (e.g., retrieved from the URL call) may be validated by the library based at least in part on a comparison to the list of trusted sources.

At 520, an encrypted payload may be received from the second mobile application. In some embodiments, an encrypted payload may be generated at the second mobile application (e.g., a managed mobile application) and transferred to the first mobile application (e.g., a management agent) using a URL scheme associated with the first mobile application.

Figure 6:
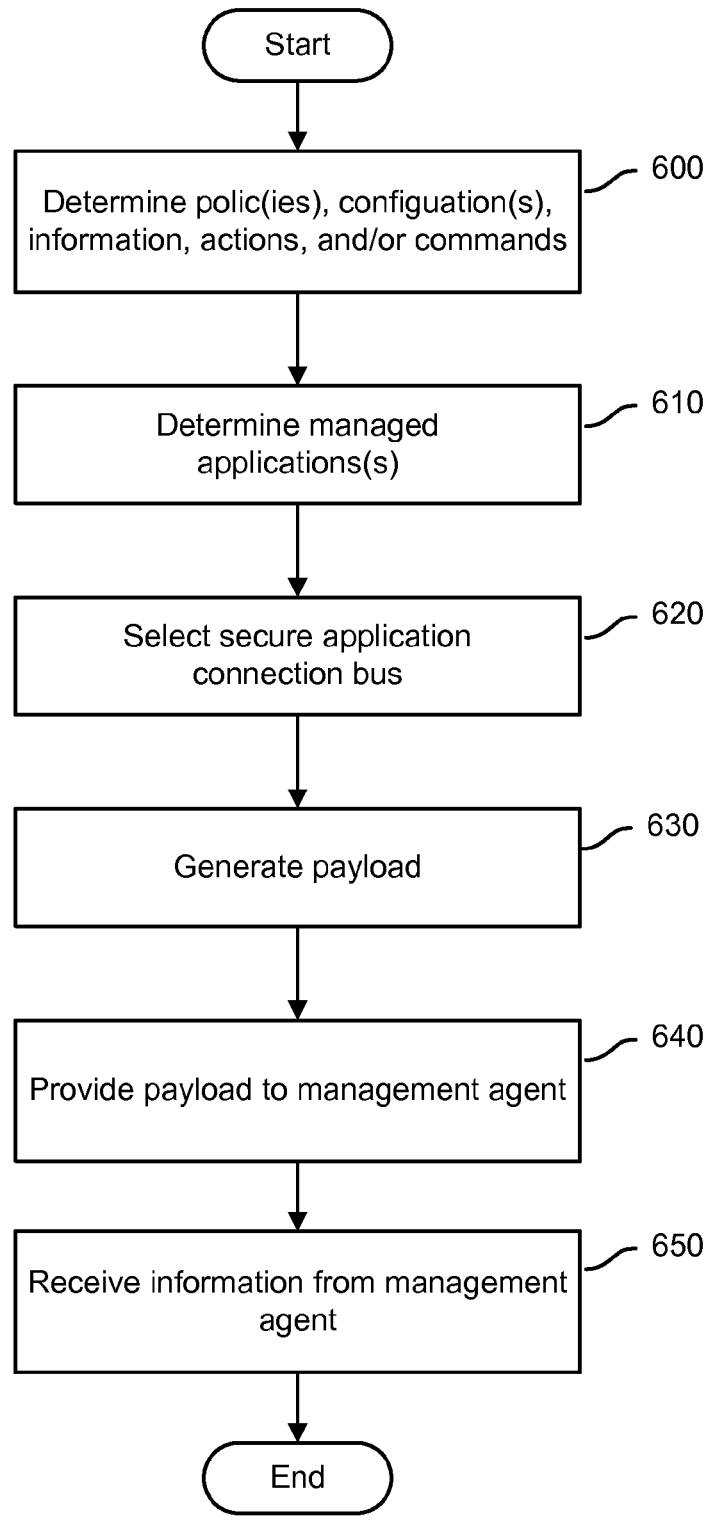
FIG. 6 is a flowchart illustrating a process of mobile application management using a secure application connection bus.

FIG. 6 is a flowchart illustrating a process of mobile application management using a secure application connection bus. In various embodiments, the process is performed by the system 100 of FIG. 1. At 600, configurations, policies, information, settings, actions, and/or commands for one or more managed applications (e.g., managed applications 104 of FIG. 1) may be determined (e.g., defined) at a security management platform (e.g., security management platform 118 of FIG. 1). For example, the configurations, policies, information, actions, enterprise authentication information, and/or settings may be received from a user (e.g., administrator) of the security management platform.

In some embodiments, configurations may affect, control, and/or govern the operation of an application. For example, a mobile application may require certain configuration information (e.g., configurations), settings, and/or other information to operate. Configuration information may include, for example, server information (e.g., server name and internet protocol (IP) address), user information (e.g., username, password, and/or device certificate to identify an application and/or device to a server), and/or other information. Configuration information may, for example, include the server(s) to which an application is configured to connect.

In various embodiments, policies associated with an application (e.g., application policies) may be used to control, manage, and/or govern the operations of an application. Policies may, for example, be determined based on enterprise polic(ies), location of device, security state of device, other application installation state, a user's group changes, and/or other information. Example policies may include, for example, hardware control policies (e.g., block application access to the device's camera, Bluetooth®, near-field communication (NFC), universal serial bus (USB), Wi-Fi, and/or other resources (e.g., set by user, group, application, time, location, etc.), storage access control policies (e.g., block access to device storage (e.g., secure digital (SD), Flash, photo, etc.), personal information manager (PIM) access control policies (e.g., block access to device email, calendar, contacts and/or other resources; allow limited access to certain (e.g., only company and not personal) email account(s), calendar, contact, and/or other resources), system service access control policies (e.g., block access to application from system services like AirPrint, shared email, information share with other applications), and/or other policies.

According to some embodiments, information (e.g., application-related information, configuration information) may be provided to an application (e.g., from a security management platform). For example, device information, enterprise information, and/or installed application information may be provided to an application to allow the application to perform functions based on the information. Device information may include, for example, a management ID, media access control (MAC) address, international mobile equipment identity (IMEI), and/or other management token(s). Enterprise information may include, for example, enterprise emergency information, contact information and/or any other enterprise-associated information. Installed application information may include an installed application list with associated capabilities (e.g., open-in documents, secure copy-paste support, etc.).

In various embodiments, settings associated with an application may be used to manage, govern, and/control the operation and/or functionality of an application. Settings may include, for example, application firewall settings and/or other settings. Application firewall rules/settings may validate and/or protect an application from receiving untrusted data. For example, application firewall rules may include enforced server certificate validation (e.g., for each secure sockets layer/transport layer security (SSL/TLS) connection, the server certificate will be validated before allowing connection), allowed network rules (e.g., only allow connect to certain networks), augmented address lookup (e.g., instead of relying system's domain name system (DNS) server, application firewall can use secure DNS server which provide additional security with authentic address information (e.g., opendns) and/or using host file pushed by management server), content inspection rules (e.g., client side only inspection and/or server-assisted content inspection to remove any malicious content), and/or other application firewall rules/settings.

In some embodiments, actions may be provided to an application to command the application to execute various operations. Actions may include, for example, a wipe application data action (e.g., wipe application data and return the application to installation state, zero out bytes before deleting), remote lock action (e.g., access to managed application (e.g., enterprise applications) may be locked until a user unlocks the application; in lock state managed/trusted application data may not be accessible to other applications), and/or other actions.

In various embodiments, before allowing access to a secure application connect bus, a user may be required to authenticate identity. For example, a user identifier (e.g., User ID), password, personal identification number (PIN), onetime password, NFC, two-dimensional (2D) barcode, and/or other user credentials may be used to validate user of, for example, a managed application. In some embodiments, this validation may be prior to the managed application being granted access to the secure application connection bus. In various, embodiments, user credentials may be required to identify a user, for example, upon opening a protected application.

At 610, one or more managed applications associated with the configurations, policies, information, actions, and/or settings may be determined. In some embodiments, the one or more managed applications may be specified by a user (e.g., administrator). For example, a group of applications may be selected based on user input (e.g., administrator input associated with configuration, policy, and/or other changes).

At 620, a secure application connection bus technique may be selected. In some embodiments, a security management platform (e.g., security management server) may determine an appropriate secure connection bus approach for deployment of information to the managed application. The secure connection bus approach may be determined based on one or more parameters including the content of the information to be transferred to the application, the level of security required for transmission, the security state of the device, attributes associated with the managed application, and/or any other parameters. For example, it may be determined that encrypted inter-application data transfer via data storage location (e.g., pasteboard) is more secure than transferring data using a URL scheme-based approach or transferring data using the native MDM management framework (e.g., an iOS MDM framework). Based at least in part on the level of security required for the data transfer, one of the secure connection bus techniques may be selected.

In some embodiments, a MDM system native to the mobile device may be used as a secure application connection bus. For example, a mobile device operating system (e.g., iOS) may include a native MDM framework (e.g., an MDM framework included in the operating system), and this native MDM framework may be used as a secure connection bus to transfer information between applications on the mobile device. In some embodiments, this native MDM based technique may be less secure than other secure application connection bus techniques discussed herein. In some embodiments, the native MDM-based secure connection bus technique may be a back-up technique and/or may be used in scenarios in which requirements for secure data transfer are reduced.

At 630, a payload may be generated (e.g., by the security management platform). According to various embodiments, the configurations, policies, information, actions, and/or settings may be compiled with one or more parameters specific to a device user, mobile device, and/or application(s). The parameters may, for example, include changing $USER_ID$ to actual user id for login, issue identity certificate for user/device, and/or other parameters. In some embodiments, the information (e.g., compiled information) may be encrypted to generate an encrypted payload (e.g., at the security management platform). In various embodiments, the information may be compiled into a payload and passed to the management agent on the device unencrypted.

At 640, the payload may be provided to the management agent. In some embodiments, an encrypted payload may be provided to (e.g., pushed to) the management agent for deployment to the managed application(s). In various embodiments, the information is provided (e.g., pushed) to the management agent may be unencrypted, and the management agent may encrypt the payload (e.g., prior to transfer to a managed application).

In some embodiments, the security management platform may specify (e.g., push) to the management agent a secure application connection bus technique to be used in transferring the payload to the managed application. As discussed below, the management agent may securely transfer the encrypted payload to the managed application using the secure application connection bus technique(s) specified by the security management platform.

At 650, information may be received from the management agent. In some embodiments, the management agent may provide the security management platform (e.g., security management server) information associated with the managed application (e.g., information from the managed application). For example, the management agent may receive response information from the managed application in response to the payload. This response information may be passed to the security management platform. The security management platform may process (e.g., analyze) the update information associated with the managed application. The security management platform may perform operations based at least in part on the information from the managed application.

By way of example, in the event the update information associated with the managed application (e.g., from the management agent) does not satisfy a quarantine policy associated with the mobile device, a quarantine command may be sent (e.g., from the security management platform) to a security enforcement node (e.g., security enforcement node 116 of FIG. 1). Upon receipt of a quarantine command, the security enforcement node may restrict (e.g., block) communications between the device and enterprise server(s) (e.g., enterprise server(s) 112 of FIG. 1) and/or other assets. In some embodiments, the security management platform may provide (e.g., in parallel) a quarantine command to the management agent. In some embodiments, the management agent may perform one or more actions based at least in part on the quarantine command including, for example, wipe at least a portion of enterprise data on the device, disable (e.g., lock down) at least one managed application, and/or actions. Other types of operations may of course be performed based on information received from the managed application.

In some embodiments, the security management platform may update one or more stored configuration, policy, settings, and/or other information associated with the managed application.

Figure 7:
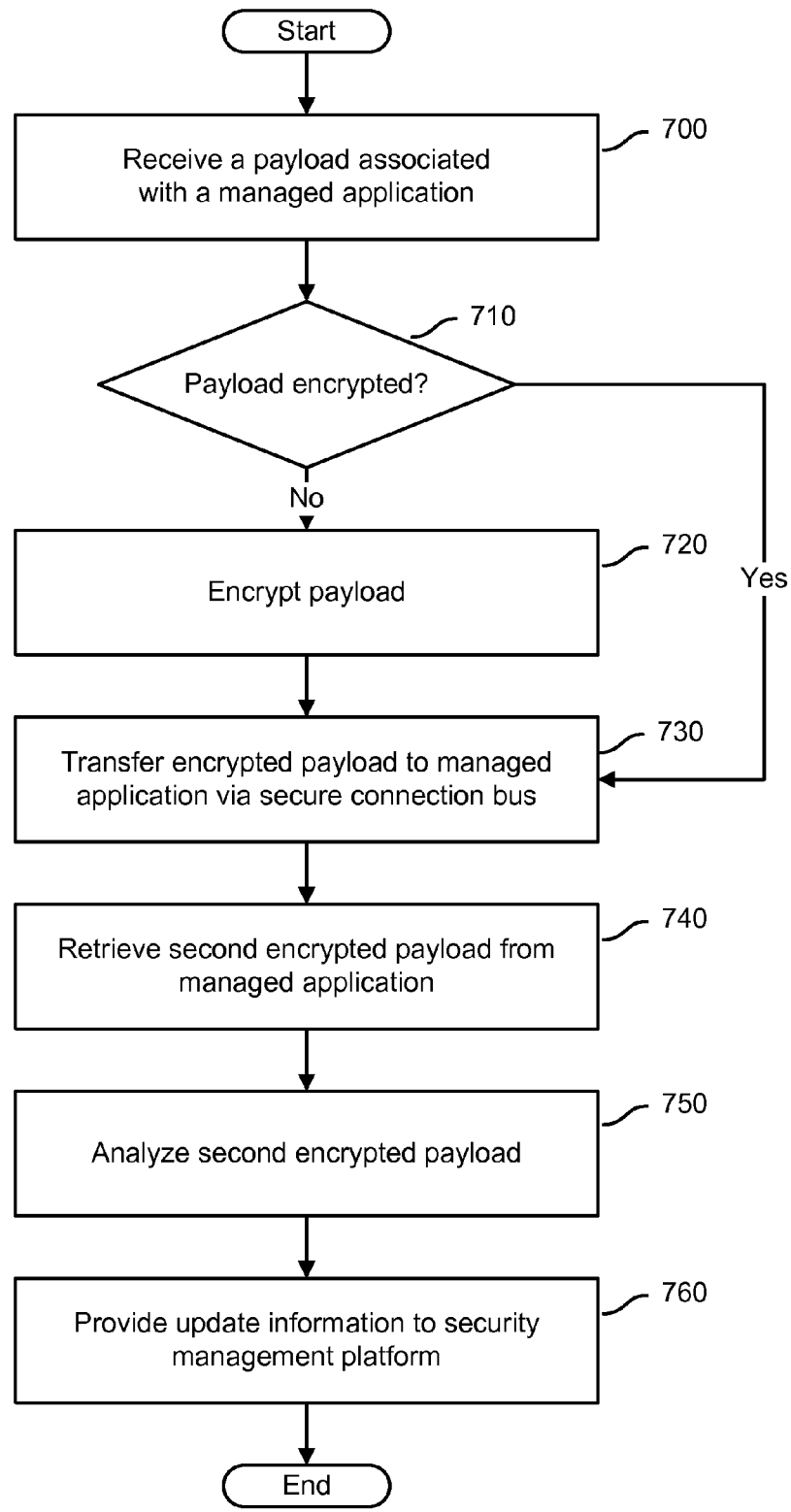
FIG. 7 is a flowchart illustrating a process of mobile application management using a secure application connection bus.

FIG. 7 is a flowchart illustrating a process of mobile application management using a secure application connection bus. In various embodiments, the process is performed by the system 100 of FIG. 1. At 700, a payload associated with a managed application is received (e.g., at a management agent associated with a mobile device). In some embodiments, the payload may be received from a security management platform (e.g., security management server) and may include configurations, policies, information, actions, and/or settings information associated with a managed application.

At 710, it may be determined whether the payload is encrypted. As discussed above, a payload may be encrypted at the security management and/or passed to the management agent un-encrypted. In the event the payload is encrypted (e.g., was encrypted at the security management platform), the process may proceed to step 730. In the event the payload is unencrypted the process may proceed to step 720.

At 720, the payload may be encrypted. In some embodiments, the payload may be encrypted at the management agent using any of the techniques disclosed herein and/or known in the art. In some embodiments, a secure connection bus may have been previously established between the management agent and the managed application. In this case, the payload may be encrypted using the information (e.g., first encryption information and second encryption information as discussed above) shared between the management agent and managed application during the secure connection bus generation/establishment/handshake process.

At 730, the encrypted payload may be transferred securely to the managed application via the secure connection bus. In some embodiments, the management agent may receive from the security management platform secure connection bus information, which may dictate a secure connection bus technique to be used in transferring the payload to the managed device. For example, the security management platform may command the management agent to transfer the encrypted package to the managed application via a data storage location (e.g., pasteboard, secure keychain storage, etc.), using a URL scheme associated with managed application, using an MDM platform native to the device, and/or using other secure connection bus approaches.

In some embodiments, the encrypted payload may be decrypted at the managed application (e.g., by a library associated with the managed application). For example, the managed application may have previously received a key (e.g., from the management agent), and the key may be used to decrypt the payload. In some embodiments, a library associated with the managed application may process (e.g., parse, analyze) the payload and apply to the managed application the configuration changes, policies (e.g., policy updates), actions, and/or settings included therein.

At 740, a second encrypted payload may be received (e.g., at the management agent from the managed application). In some embodiments, the managed application may execute the configuration changes, policy updates, setting changes, and/or actions included in the encrypted package (e.g., received from the management agent). Upon execution of the actions, the managed application may generate a second encrypted package including update information (e.g., based on the executed actions). This second encrypted payload may be passed to the management agent (e.g., using a secure connection bus technique).

At 750, the second encrypted payload may be parsed, processed, and/or analyzed at the management agent. In some embodiments, the management agent may process, interpret, and/or analyze the update information included in the second encrypted payload. The management agent may, in certain instances, perform operation(s) based at least in part on the update information. For example, in the event local policy enforcement is enabled (e.g., by the security management platform), the management agent may push configuration updates to the device when certain policy conditions are satisfied.

At 760, the management agent may provide (e.g., pass) the update information (e.g., included in the second encrypted information from the managed application) to the security management platform. The security management platform may perform one or more operations (e.g., execute quarantine action(s), update configurations, update policies, and other actions discussed above) based on the update information from the managed application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of secure communication between mobile applications, comprising:
providing, from a first mobile application on a mobile device to a second mobile application on the mobile device, a first encryption information and an identifier associated with a data storage location on the mobile device, wherein a library associated with the second mobile application validates an identifier associated with the first mobile application and wherein the data storage location comprises a shared keychain location;
retrieving, from the data storage location, a second encryption information associated with the second mobile application, wherein the second mobile application is configured to provide the second encryption information to the data storage location at least in part in response to receiving the first encryption information, the identifier associated with the data storage location, and the first mobile application being validated, and wherein the second mobile application is configured to generate and include in the second encryption information an application identifier associated with the second mobile application;
validating an identity of the second mobile application based at least in part on the application identifier included in the second encryption information; and
transferring data securely between the first mobile application and the second mobile application via the data storage location, including by encrypting the data using a second encryption key included in the second encryption information.

2. The method of claim 1, wherein the first mobile application comprises a management agent.

3. The method of claim 1, wherein the second mobile application is configured to provide the second encryption information to the data storage location at least in part by including in the second mobile application a mobile app management library.

4. The method of claim 1, wherein the data storage location comprises a paste board.

5. The method of claim 1, wherein the first encryption information comprises a public key associated with the first mobile application.

6. The method of claim 1, wherein the second encryption information comprises a public key and the second mobile application is configured to retrieve encrypted data stored in the data storage location by the first mobile application and use a private key associated with the second mobile application to decrypt the encrypted data.

7. The method of claim 1, wherein the second mobile application is configured to transfer data to the first mobile application at least in part by using the first encryption information to encrypt data to be transferred, and storing the encrypted data in the data storage location.

8. The method of claim 1, wherein the first encryption information is received by the first mobile application from a security management platform external to the mobile device.

9. The method of claim 1, wherein the first mobile application is configured to generate the identifier associated with the data storage location.

10. A mobile device, comprising:
a storage device; and
a processor coupled to the storage device and configured to:
provide, from a first mobile application on a mobile device to a second mobile application on the mobile device, a first encryption information and an identifier associated with a data storage location on the storage device, wherein a library associated with the second mobile application validates an identifier associated with the first mobile application and wherein the data storage location comprises a paste board;
retrieve, from the data storage location, a second encryption information associated with the second mobile application, wherein the second mobile application is configured to provide the second encryption information to the data storage location at least in part in response to receiving the first encryption information, the identifier associated with the data storage location, and the first mobile application being validated, and wherein the second mobile application is configured to generate and include in the second encryption information an application identifier associated with the second mobile application;
validate an identity of the second mobile application based at least in part on the application identifier included in the second encryption information; and
transfer data securely between the first mobile application and the second mobile application via the data storage location, including by encrypting the data using a second encryption key included in the second encryption information.

11. The system of claim 10, wherein the first mobile application comprises a management agent.

12. The system of claim 10, wherein the second mobile application is configured to provide the second encryption information to the data storage location at least in part by including in the second mobile application a mobile app management library.

13. The system of claim 10, wherein the data storage location comprises a paste board.

14. The system of claim 10, wherein the first encryption information comprises a public key associated with the first mobile application.

15. The system of claim 10, wherein the second encryption information comprises a public key and the second mobile application is configured to retrieve encrypted data stored in the data storage location by the first mobile application and use a private key associated with the second mobile application to decrypt the encrypted data.

16. The system of claim 10, wherein the second mobile application is configured to transfer data to the first mobile application at least in part by using the first encryption information to encrypt data to be transferred, and storing the encrypted data in the data storage location.

17. The system of claim 10, wherein the first encryption information is received by the first mobile application from a security management platform external to the mobile device.

18. A computer program product to provide secure communication between mobile applications, the computer program product being embodied in a non-transitory computer readable medium and comprising computer instructions for:
providing, from a first mobile application on a mobile device to a second mobile application on the mobile device, a first encryption information and an identifier associated with a data storage location on the mobile device, wherein a library associated with the second mobile application validates an identifier associated with the first mobile application and wherein the data storage location comprises a paste board;
retrieving, from the data storage location, a second encryption information associated with the second mobile application, wherein the second mobile application is configured to provide the second encryption information to the data storage location at least in part in response to receiving the first encryption information, the identifier associated with the data storage location, and the first mobile application being validated, and wherein the second mobile application is configured to generate and include in the second encryption information an application identifier associated with the second mobile application;
validating an identity of the second mobile application based at least in part on the application identifier included in the second encryption information; and
transferring data securely between the first mobile application and the second mobile application via the data storage location, including by encrypting the data using a second encryption key included in the second encryption information.

19. The method of claim 1, wherein the library includes a list of trusted application and the library validates the first mobile application based on whether the identifier associated with the first mobile application is on the list of trusted applications.

20. The method of claim 1, wherein the library modifies code associated with the second application to modify a behavior of the second application.

* * * * *